(12) United States Patent
Czakó et al.

(10) Patent No.: US 10,467,181 B2
(45) Date of Patent: Nov. 5, 2019

(54) INTERFACE APPARATUS AND METHOD

(71) Applicant: ARM Limited, Cambridge (GB)

(72) Inventors: Peter Czakó, Pilisvorosvar (HU); Seow Chuan Lim, Letchworth Garden (GB); Dominic William Brown, Ely (GB); Christopher Vincent Severino, Haverhill (GB); Patrick Michael Overs, St Neots (GB)

(73) Assignee: ARM Limited, Cambridge (GB)

( * ) Notice: Subject to any disclaimer, the term of this patent is extended or adjusted under 35 U.S.C. 154(b) by 70 days.

(21) Appl. No.: 15/603,769

(22) Filed: May 24, 2017

(65) Prior Publication Data
US 2018/0004704 A1 Jan. 4, 2018

(30) Foreign Application Priority Data

Jun. 30, 2016 (GB) .................................... 1611451.4

(51) Int. Cl.
*G06F 13/16* (2006.01)
*G06F 13/28* (2006.01)
(Continued)

(52) U.S. Cl.
CPC ...... *G06F 13/4295* (2013.01); *G06F 13/1673* (2013.01); *G06F 13/28* (2013.01); *G06F 13/364* (2013.01)

(58) Field of Classification Search
CPC .. G06F 13/4295; G06F 13/1673; G06F 13/28; G06F 13/364
See application file for complete search history.

(56) References Cited

U.S. PATENT DOCUMENTS

| 4,058,773 A * | 11/1977 | Clark ..................... G11C 19/28 327/545 |
| 2010/0077234 A1* | 3/2010 | Das ....................... G06F 1/3203 713/300 |

(Continued)

OTHER PUBLICATIONS

Combined Search and Examination Report for GB1611451.4 dated Dec. 20, 2016, 7 pages.

*Primary Examiner* — Idriss N Alrobaye
*Assistant Examiner* — Ronald T Modo
(74) *Attorney, Agent, or Firm* — Nixon & Vanderhye P.C.

(57) ABSTRACT

An interface comprises routing circuitry configured to receive data items from a data source device and to route the received data items to a data sink device by either a first data path including a data buffer or a second data path, in response to an indication of a current state of a data sink device; the routing circuitry being configured to route the received data item by the first data path and to initiate a transition of the data sink device to a ready state in response to an indication that the data sink device is in a quiescent mode and currently not ready to receive the data item, the routing circuitry being configured to hold the data item at the buffer and to inhibit the data source device from sending further data items until the routing circuitry receives a subsequent indication that the data sink device is ready to receive the data item; and the routing circuitry being configured to route the received data item by the second data path in response to an indication that the data sink device is currently ready to receive the data item.

15 Claims, 9 Drawing Sheets

(51) Int. Cl.
*G06F 13/42* (2006.01)
*G06F 13/364* (2006.01)

(56) References Cited

U.S. PATENT DOCUMENTS

2012/0151234 A1 6/2012 Teague et al.
2016/0055110 A1* 2/2016 Herbeck ............ G06F 13/4022
710/316

* cited by examiner

INTERFACE APPARATUS AND METHOD

This application claims priority to GB Patent Application No. 1611451.4 filed Jun. 30, 2016, the entire contents of which are hereby incorporated by reference.

BACKGROUND

The present disclosure relates to interface apparatus and methods.

It is known to provide interconnect circuitry for interconnecting a number of master devices with a number of slave devices, to enable transactions to be performed between the master devices and the slave devices in order to transfer data between the master and slave devices. Each transaction between a master device and a slave device will comprise one or more transfers. Typically a predetermined bus protocol is used defining requirements for the various signals routed through the interconnect circuitry to represent the transfers, and allowed transitions in those signals.

Some bus transfer protocols require that a first data transaction is accepted by a recipient device.

SUMMARY

In one example configuration, there is provided an interface comprising:

routing circuitry configured to receive data items from a data source device and to route the received data items to a data sink device by either a first data path including a data buffer or a second data path, in response to an indication of a current state of a data sink device;

the routing circuitry being configured to route the received data item by the first data path and to initiate a transition of the data sink device to a ready state in response to an indication that the data sink device is in a quiescent mode and currently not ready to receive the data item, the routing circuitry being configured to hold the data item at the buffer and to inhibit the data source device from sending further data items until the routing circuitry receives a subsequent indication that the data sink device is ready to receive the data item; and the routing circuitry being configured to route the received data item by the second data path in response to an indication that the data sink device is currently ready to receive the data item.

In another example configuration, there is provided an interface comprising:

routing means for receiving data items from a data source device and for routing the received data items to a data sink device by either a first data path including a data buffer or a second data path, in response to an indication of a current state of a data sink device;

the routing means being operable to route the received data item by the first data path and to initiate a transition of the data sink device to a ready state in response to an indication that the data sink device is in a quiescent mode and currently not ready to receive the data item, the routing means being operable to hold the data item at the buffer and to inhibit the data source device from sending further data items until the routing means receives a subsequent indication that the data sink device is ready to receive the data item; and the routing means being configured to route the received data item by the second data path in response to an indication that the data sink device is currently ready to receive the data item.

In another example configuration, there is provided an interface method comprising:

receiving data items from a data source device;

routing the received data items to a data sink device by either a first data path including a data buffer or a second data path, in response to an indication of a current state of a data sink device;

the routing step comprising:

routing the received data item by the first data path and to initiate a transition of the data sink device to a ready state in response to an indication that the data sink device is in a quiescent mode and currently not ready to receive the data item, holding the data item at the buffer and inhibiting the data source device from sending further data items until a subsequent indication that the data sink device is ready to receive the data item is received; and routing the received data item by the second data path in response to an indication that the data sink device is currently ready to receive the data item.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
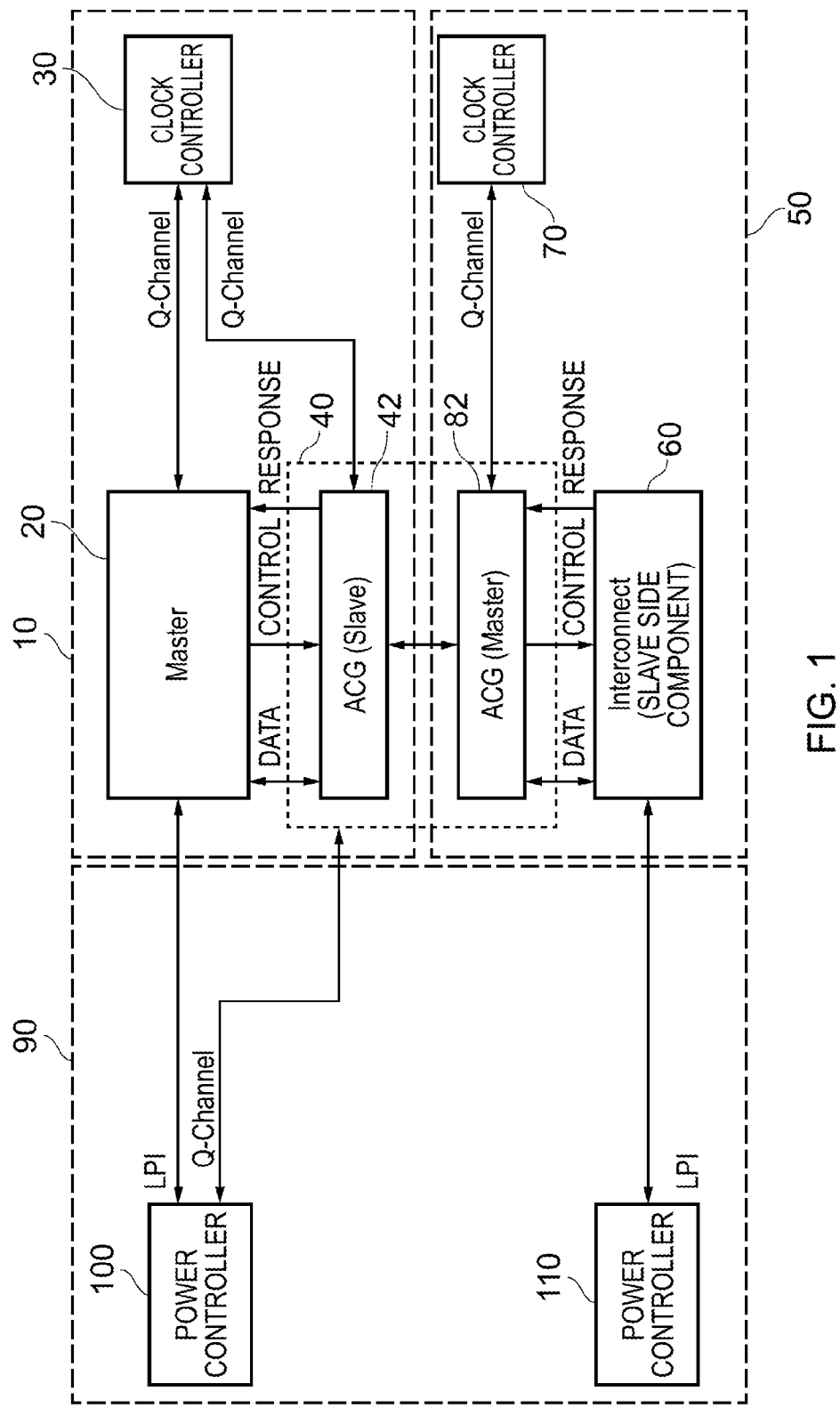
FIG. 1 schematically illustrates a data processing apparatus.

Before discussing the embodiments with reference to the accompanying figures, the following description of embodiments is provided.

In one embodiment, there is provided an interface comprising:

routing circuitry configured to receive data items from a data source device and to route the received data items to a data sink device by either a first data path including a data buffer or a second data path, in response to an indication of a current state of a data sink device;

the routing circuitry being configured to route the received data item by the first data path and to initiate a transition of the data sink device to a ready state in response to an indication that the data sink device is in a quiescent mode and currently not ready to receive the data item, the routing circuitry being configured to hold the data item at the buffer and to inhibit the data source device from sending further data items until the routing circuitry receives a subsequent indication that the data sink device is ready to receive the data item; and the routing circuitry being configured to route the received data item by the second data path in response to an indication that the data sink device is currently ready to receive the data item.

The example embodiments allow a data transfer from a data source device to be received as though by a data sink device, even when that data sink device is in a quiescent mode, by the interface between the data source and data sink devices buffering the data item until the data sink device has returned to an active mode. In the meantime, the data source device is inhibited by the interface from sending further data items. This advantageously allows the co-existence of normally conflicting requirements of power saving (by allowing devices to enter a quiescent mode) and the receipt of a first data item from a data source, for example as required under some data transfer protocols.

In some protocols of this type, a first data transfer transaction must be accepted without the possibility of stalling or otherwise inhibiting the first transaction or its completion.

In at least examples, the quiescent mode is not part of the data transfer protocol but is controlled (at least in part) by the interface or other circuitry. The present techniques therefore differ from protocol-driven mechanisms (such as ready signals) for providing so-called back pressure to inhibit or delay transactions. In examples of the present arrangements, as far as the data source is concerned, a first data transaction to the data sink has completed successfully. It is the interface which buffers the data item and returns signals to the data source in the case of a currently-quiescent data sink.

In order that data transfers are not delayed by the second data path in situations where the data sink device is active, in examples, the data items are received by the interface according to a data item clock; and a given data item routed by the second data path is provided at an output of the second data path during the same clock cycle in which that given data item was routed to the second data path. In examples, the second data path does not introduce additional latency.

In examples, the data sink device is configured to operate in a lower power consumption mode in which the data sink device is not ready to receive a data item, and a higher power consumption mode in which the data sink device is ready to receive a data item. In such situations, a power controller can be provided to control a power consumption of the data sink device.

In examples, the data sink device is configured to operate in a lower speed or clock running mode in which the data sink device is not ready to receive a data item and a higher speed or clock running mode in which the data sink device is ready to receive a data item. In such arrangements a clock controller can be provided to control the clock speed of the data source device.

In examples, data transfers from a data source device are controlled by the data source device such that a data item is sent by a data source device in response to a ready indication from a data sink device. In such arrangements, the routing circuitry is configured, for a data sink device currently in the quiescent mode, to provide a ready indication to the data source device, to receive and hold a first data item from the data source device, and to inhibit the data source device from sending further data items by providing a not ready indication to the data source device. In this way an appropriate handshake signal can be provided back to the data source device as though it came from the data sink device, even when the data sink device itself is in a quiescent mode. The ready signal, when used in this way, is such that a first transaction cannot be stopped or delayed using the ready signal, but subsequent transactions (whether single or burst transactions) can be stalled using the ready signal.

While a data item is being held in the buffer, in example arrangements the routing circuitry is configured to provide a signal to the data sink device indicating an idle state of the data source device when a data item is held by the buffer (which is to say, while the data sink device is quiescent, before becoming active again).

To avoid a data sink device starting a process of entering the quiescent mode only to be woken up again because there is already a pending transaction in progress, in examples the interface comprises circuitry to inhibit a data sink device entering the quiescent mode while a data transfer transaction relating to a data item associated with that data sink device is being routed by the interface.

In order to preserve the data transaction order intended by the data source device, in examples, when a data item for the sink device has been held at the data buffer, the routing circuitry is configured to pass the data item held by the data buffer to the sink device in response to the sink device becoming ready to receive the data item, before the routing circuitry routes any data items to that sink device by the second data path.

In examples, data transfer transactions between the data source device and the data sink device are handled by a protocol which requires a first data transfer from a data source device to be accepted. An example of such a protocol is the Advanced High-performance Bus protocol (such as the ARM AMBA AHB Protocol)

In another embodiment, there is provided a data processing system comprising:
one or more data source devices;
one or more data sink devices; and
an interface as discussed above disposed in a data path between the data source and data sink devices.

In examples, the one or more data source devices are master devices;
the one or more data sink devices are slave devices; and
each master device is configured to control data transfer transactions between that master device and one or more of the data sink devices.

These arrangements are particularly suited to so-called system on chip (SoC) arrangements, in which the system is implemented by a single integrated circuit.

In another embodiment, there is provided an interface comprising:
routing means for receiving data items from a data source device and for routing the received data items to a data sink device by either a first data path including a data buffer or a second data path, in response to an indication of a current state of a data sink device;
the routing means being operable to route the received data item by the first data path and to initiate a transition of the data sink device to a ready state in response to an indication that the data sink device is in a quiescent mode and currently not ready to receive the data item, the routing means being operable to hold the data item at the buffer and to inhibit the data source device from sending further data items until the routing means receives a subsequent indication that the data sink device is ready to receive the data item; and
the routing means being configured to route the received data item by the second data path in response to an indication that the data sink device is currently ready to receive the data item.

In another embodiment, there is provided an interface method comprising:

receiving data items from a data source device;

routing the received data items to a data sink device by either a first data path including a data buffer or a second data path, in response to an indication of a current state of a data sink device;

the routing step comprising:

routing the received data item by the first data path and to initiate a transition of the data sink device to a ready state in response to an indication that the data sink device is in a quiescent mode and currently not ready to receive the data item, holding the data item at the buffer and inhibiting the data source device from sending further data items until a subsequent indication that the data sink device is ready to receive the data item is received; and routing the received data item by the second data path in response to an indication that the data sink device is currently ready to receive the data item.

Referring now to the drawings, FIG. 1 schematically illustrates a data processing apparatus formed of master side components 10, slave side components 50 and power control components 90. The master side components include one or more master devices 20, a master side clock controller 30 and the master side 42 of an access control gate (ACG) 40. The slave side components include an interconnect 60, a slave side clock controller 70 and the slave side 82 of the ACG. The master devices 20 provide an example of one or more data source devices; the interconnect 60 provides an example of one or more data sink devices; and the ACG provides an example of an interface disposed in a data path between the data source and data sink devices.

The power and clock control discussed above provides an example of the following: an arrangement in which the data sink device is configured to operate in a lower power consumption mode in which the data sink device is not ready to receive a data item, and a higher power consumption mode in which the data sink device is ready to receive a data item; a power controller to control a power consumption of the data sink device; an arrangement in which the data sink device is configured to operate in a lower speed or clock running mode in which the data sink device is not ready to receive a data item and a higher speed or clock running mode in which the data sink device is ready to receive a data item; and a clock controller to control the clock speed of the data source device.

The master devices can take a variety of forms, and although only one master device is shown on FIG. 1, multiple master devices can be provided. For example one or more of the master devices may be central processing units (CPUs), whilst other master devices may be graphics processing units (CPUs), Direct Memory Access (DMA) units, and the like.

Similarly, although only one slave-side device is shown on FIG. 1, multiple slave devices can be provided. The slave devices can also take a variety forms, for example memory devices such as SRAM or FLASH memory devices, general purpose I/O devices (GPIOs), display buffers, etc.

This provides an example of an arrangement in which the one or more data source devices are master devices; the one or more data sink devices are slave devices; and each master device is configured to control data transfer transactions between that master device and one or more of the data sink devices.

In example embodiments, the system shown in FIG. 1 forms (or forms part of) a so-called System-on-Chip (SoC) where the various master devices, slave devices, the ACG and the interconnect circuitry are integrated into a single chip. In such an arrangement, one or more of the slave devices may in fact form interface circuitry to an off-chip component (not shown in FIG. 1). This provides an example of the system being implemented by a single integrated circuit.

The ACG is a block which can be placed on a synchronous clock or power domain boundary, as it is capable of passing or blocking data transfer transactions whenever the receiving side of the transactions is not able to accept the transfer. It will be described in more detail below.

The ACG has a slave interface 42 for coupling to the master side components and a master interface 82 for coupling to the slave side components. Transactions are performed between a master device and a slave device in order to transfer data between the master device and the slave device in either direction, and each transaction can consist of one or more transfers. A number of signals will be passed through the ACG circuitry for each transfer. As shown in FIG. 1, the signals can generally be considered to be of three types. In particular, master control signals can be issued from the master side component identifying the nature of the transfer, the address being accessed, and the like. Data signals will also be generated, which for a write operation will pass from the master side to the slave side, and for a read operation will pass from the slave side to the master side. In addition, certain slave response signals can be issued from the slave side to the master side, for example to provide information about the status of the transfer (such as whether it has completed successfully), for example to cause the master device to prolong a transfer when the slave device is still handling a preceding transfer, etc. The exact form of the signals generated will be dependent on the bus protocol adopted within the ACG, the bus protocol defining the requirements for the various signals routed through the interconnect circuitry to represent the transfers, and also typically identifying allowed transitions in one or more of those signals. Whilst the techniques described here may be applied to a variety of different bus protocols, for the purpose of illustration the embodiments will be described with reference to the Advanced High-performance Bus (AHB) protocol specified in the Advanced Microcontroller Bus Architecture (AMBA) developed by ARM Limited, of Cambridge, United Kingdom. This (AHB) provides an example of data transfer transactions between the data source device and the data sink device being handled by a protocol which requires a first data transfer from a data source device to be accepted.

The master side and the slave side are under the control of their respective clock controllers 30, 70. These can be used to control or set the clock speed by which the components under their control operate. For example, the respective clock can be stopped or slowed down to move to a lower power or quiescent state, and returned to a normal clock speed or running state in order to revert to normal (non-quiescent) operations. Similarly, the master side components and the slave side components are under the control of respective power controllers 100, 110 which can interact with the components by an LPI (low power interface) and are responsible for power control sequencing and control for the power domain it controls (for example, providing handshaking logic within the domain to move it to a safe state).

The clock controllers communicate with the master side devices and the ACG using a so-called Q channel protocol (another example, not described or used further in these particular examples, is a so-called P-Channel protocol). The same Q channel protocol is an example of an LPI used by the power controllers 100, 110 to communicate with the ACG.

The Q-Channel protocol is used to interface to the power or clock controller. The signals in this table are routed directly in the component hierarchy to top level pins of the component.

Q Channel Signals

| Signals used between devices or components | Direction (at a controlled device) | Description |
|---|---|---|
| QREQn | Input | Active low quiescence request from Q-Channel interface. Asserts when a clock or power controller wants the component to enter a low power (quiescent) state. |
| QACCEPTn | Output | Active low quiescence accept to Q-Channel interface. Asserted by the component in response to qreq_sync_n to indicate that the request is accepted and the power or clock that is controlled by this interface may be removed. |
| QDENY | Output | Active high quiescence denial to Q-Channel interface. Asserted by the component in response to qreq_sync_n to indicate that the request is denied and the power or clock that is controlled by this interface may not be removed. Driven synchronously to clk. |
| QACTIVE | Output | Active high indication to Q-Channel interface that the component requires a clock or power. Driven combinatorially from sources in the component that constitute the activity conditions. |

FIG. 1 shows just one power controller and one clock controller for each of the master and slave sides. There could of course be a more complex power and/or clock control arrangement.

Figure 2A:
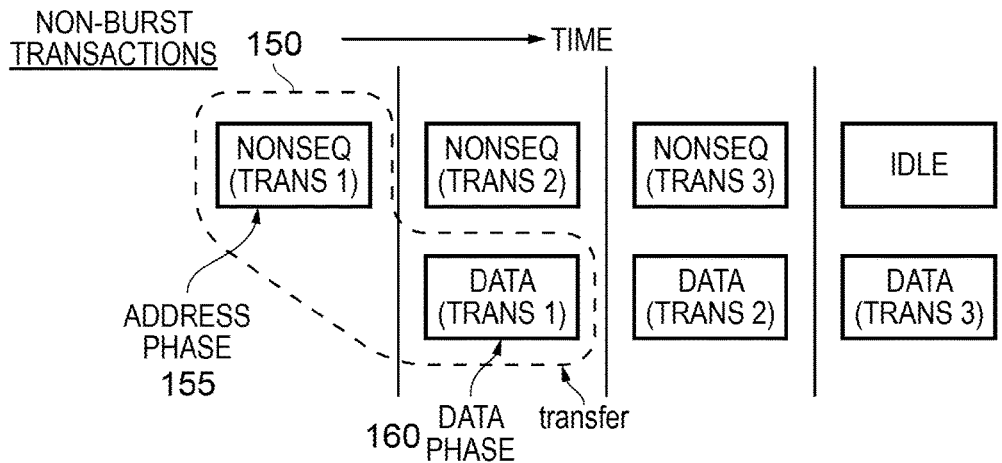
FIGS. 2a and 2b schematically illustrate data transfer transactions.
Figure 2B:
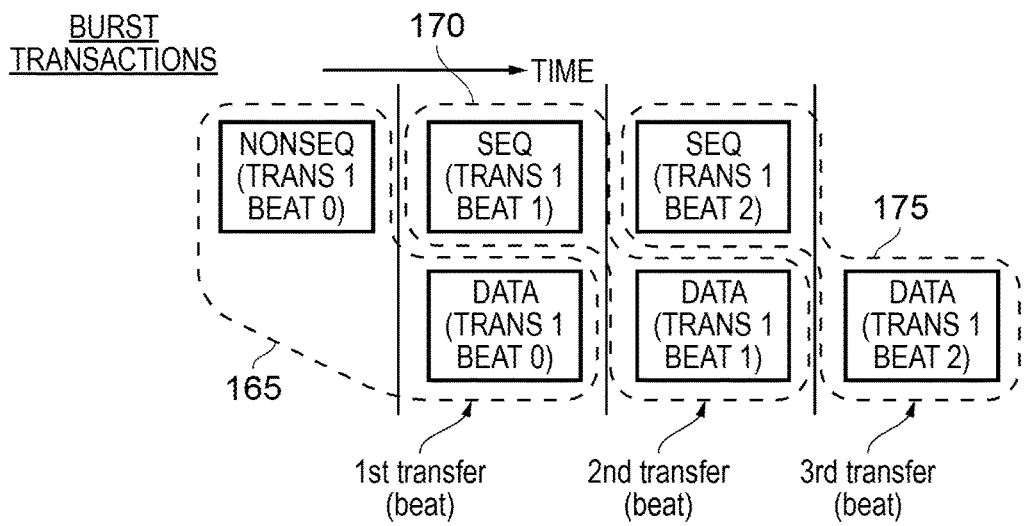

FIGS. 2a and 2b schematically illustrates two example types of data transfer transaction that can be processed by the apparatus of the described embodiments. As shown in FIG. 2a, so-called non-burst transactions can be processed, a non-burst transaction including a single transfer 150. In accordance with the AHB protocol, each such transfer includes an address phase 155 and a subsequent data phase 160. The master control signals shown in FIG. 1 are valid during the address phase, whilst the data and slave response signals are valid during the data phase 160. During the address phase, an address signal is provided identifying the address being accessed. In addition, various other control signals are issued in the address phase, and in the AHB protocol one such signal is the "HTRANS" signal which indicates the transfer type of the current transfer. For non-burst transactions, the transfer will be marked as a non-sequential (NONSEQ) transfer as shown for the address phase 155 of the transfer 150 in FIG. 2a.

The individual transactions can be handled in a pipelined way, such that whilst the data phase 160 of the transfer 150 is being handled, the address phase of a next transaction can also be in the process of being handled. Therefore, considering the ACG, it can simultaneously be arranged to be handling the address phase of one transaction and the data phase of a preceding transaction, and separate filtering decisions from the filtering logic may apply to those different transfers.

The apparatus can be used to handle burst transactions, a burst transaction comprising a plurality of successive transfers, such as the transfers 165, 170, 175 shown in FIG. 2b. These individual transfers may also be referred to as "beats" of the burst transaction. A non-burst transaction can hence be viewed as a transaction with a single beat. The first transfer of a burst transaction also has its HTRANS signal set to NONSEQ to identify that it is a non-sequential transfer, but each of the subsequent transfers has the HTRANS signal set to "SEQ", identifying that they are sequential transfers, which is to say that transfers occurring to an adjacent address to the address specified in the preceding transfer. Again, the individual transfers can be pipelined so that the address phase of one transfer is being handled at the same time as the data phase of a preceding transfer within the burst.

In accordance with the AHB protocol, other transfer types that can be specified by the HTRANS signal are the "BUSY" type, enabling a master device to insert an idle cycle in the middle of a burst, and the "IDLE" type which the master can output to identify that it does not want to perform a data transfer at that time.

In accordance with the AHB protocol, the slave devices cannot prevent the master from asserting transfers, but one of the slave response signals provided is an "HREADY" signal that is set by the slave to indicate that a transfer has finished being processed by the slave side component. If instead that ready signal is cleared, this indicates that the slave device is still processing the data transfer of a current transfer, and will cause the master device to extend its assertion of the address phase for a next transfer for one or more further clock cycles until the ready signal is asserted, and hence the slave device is ready to accept that next transfer.

In examples, the ACG operates under the control of a bus clock, referred to as the HCLK signal, which controls the timing of all bus transfers. In one embodiment, all signal timings are related to the rising edge of HCLK. Accordingly, by way of example, both the master side components and the slave side components will sample their signals on the rising edge of the HCLK clock signal.

A further feature of the AHB protocol is that it defines that the very first transaction shall be accepted by any slave device with a ready response.

However, in the case that the recipient slave device is powered down, and/or its clock speed is turned down or stopped, which is to say that the slave device is in a quiescent state, the slave device first needs to be returned to a normal (non-quiescent) operating state in order for the slave device to receive the transfer.

Therefore, in order to comply with this requirement of the AHB protocol while still allowing slave devices to enter a quiescent state, the ACG of the present examples is configured to hold (or buffer, or latch) a first incoming transaction and to clear the HREADY signal while the slave device is returned to a normal or active (non-quiescent) state. The ACG therefore accepts the first transaction on behalf of the slave device, passing it to the slave device when the slave device is powered up or otherwise returned to normal operation, and (in examples) extends the data phase until the slave device is ready so as to inhibit further transactions from taking place until the slave is ready to receive them. The ACG also initiates the waking up of the slave device when such a transaction is received.

Although one possibility for implementing such an arrangement would be to place a controllable latch in the ACG signal path between master device and slave device such that each transaction was passed via the latch, this would introduce an unacceptable delay in every transaction (even if the slave was ready to process the transaction).

Therefore, in the ACG, there is provided routing circuitry configured to receive data items from a data source device (such as a master device) and to route the received data items to a data sink device (such as a slave device) by either a first data path including a data buffer or a second data path, in response to an indication of a current state of a data sink device. The routing circuitry is configured to route the received data item by the first data path and to initiate a transition of the data sink device to a ready state in response to an indication that the data sink device is currently not ready to receive the data item, the routing circuitry being configured to hold the data item at the buffer and to inhibit the data source device from sending further data items until the routing circuitry receives a subsequent indication that the data sink device is ready to receive the data item. So, when the slave device is in a quiescent mode (or other mode other than a normal mode) the first transaction is buffered and the HREADY signal (in these examples) is cleared. When the slave device is ready to receive data (either because it was already in a non-quiescent state or because it has returned to a non-quiescent state having been woken up in response to the first transaction) the routing circuitry is configured to route the received data item by the second data path in response to an indication that the data sink device is currently ready to receive the data item.

Another feature of these aspects of the ACG are that incoming low power requests are (in at least some examples) denied when there is an already-ongoing transfer through the ACG.

An example ACG is implemented as multiple hierarchy levels. On the lowest level there is an entity referred to as an LPI Slave which is capable of handling one Q-Channel interface towards either a clock or a power controller. An example of an LPI slave is shown schematically in FIG. 3. It provides a Q-Channel handling module and outputs different control and status signals based upon the actual state of the LPI Slave.

Note that more than one incoming transaction might be buffered, or that a "data item" might contain or represent data for more than one transaction.

Figure 3:
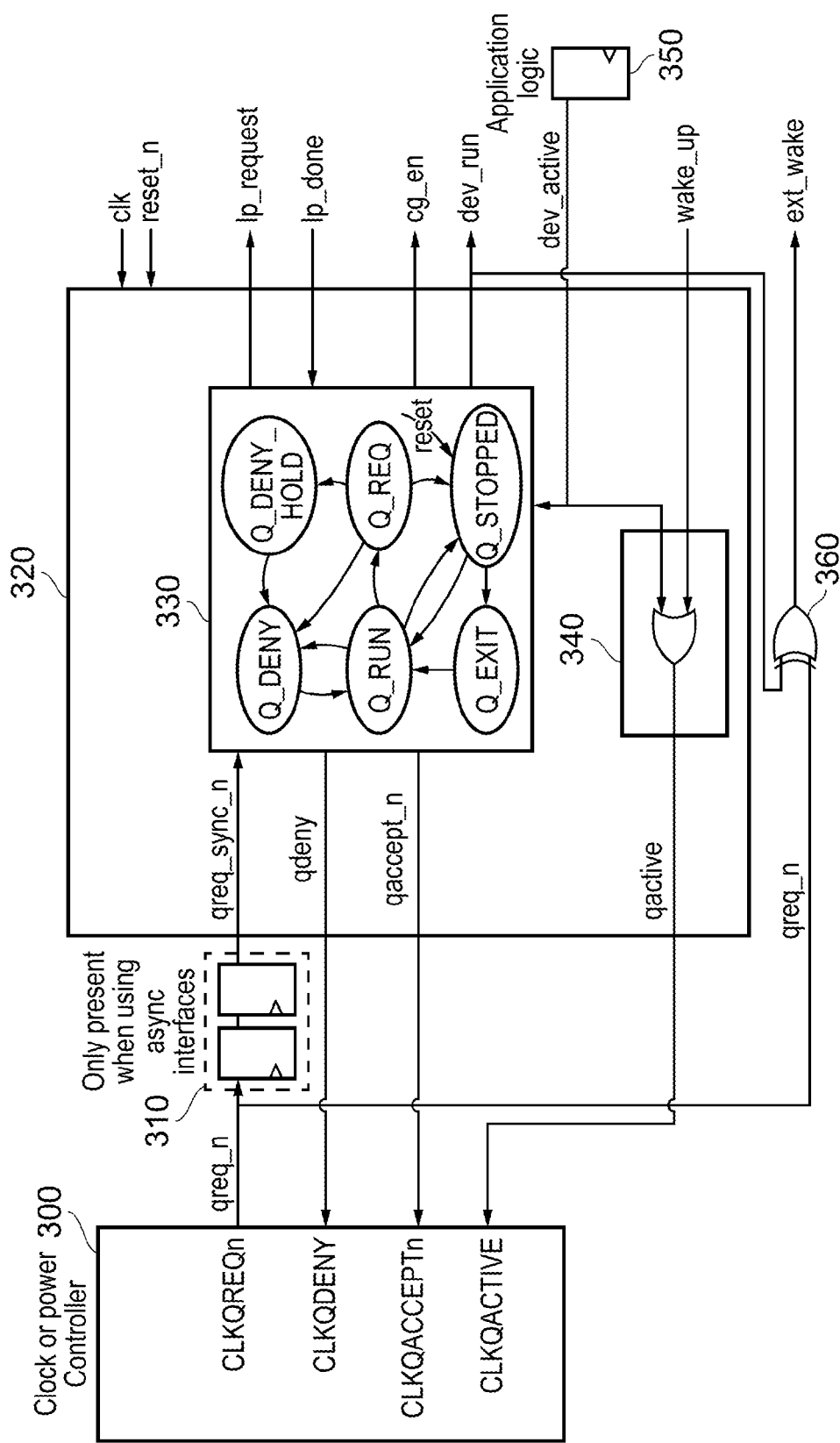
FIG. 3 schematically illustrates an LPI slave device.

Referring to FIG. 3, a clock or power controller 300 has a "request" output qreq_n and three inputs: "deny", "accept" and "active" as discussed above. Optionally, a synchroniser 310 is provided to synchronise the request signal (to form qreq_sync_n, a synchronised request signal, as discussed above). If a synchronous interface is being used, the synchroniser 310 is not required.

The LPI slave device 320 comprises a state machine 330 and an OR gate 340. It interfaces with application logic 350 running on the controlled device(s). A final component in FIG. 3 is an exclusive OR gate 360 which will be explained below.

The state machine 320 moves between six different states: Q_STOPPED, Q_EXIT, Q_REQ, Q_RUN, Q_DENY AND Q_DENY_HOLD. Movement between the states is controlled by a combination of input signals to the LPI slave device 320, and the presence of the state machine in one of the states causes the output of signals from the LPI slave device 320. These input and output conditions will be discussed in further detail below with reference to FIG. 4.

The q_active signal is formed as an OR combination of a device active (dev_active) signal from the application logic 350 indicating that the application logic is running and the corresponding device is active and a wake_up signal provided to the LPI slave device 320. An external wake up signal ext_wake is generated by the exclusive OR gate 360 as a combination of the request signal from the clock or power controller 300 and a device run (dev_run) signal generated by the state machine 330 (to be described below). A low power mode request signal lp_request is provided from the state machine 330 to the controlled device to request that the controlled device goes into a low power mode, and an acknowledgement lp_done is received from the controlled device to indicate that the lp_request has been accepted and actioned. Note that in some instances, if it can be guaranteed that once an lp_request signal has been issued to a controlled device it will be actioned with no further delay, the lp_request signal can be looped back to the lp_done input rather than having to obtain a response from the controlled device itself. A clock signal clk and a reset signal reset_n provide clock and reset indications to the LPI slave device 320. A further signal cg_e_n is provided to contribute to the internal clock gating logic.

The various signals are summarised in the following tables:

Clock and Reset Signals

| Signal | | Description |
|---|---|---|
| clk | Input | Main clock. When used as a clock control LPI, this is also the clock that is gated off at the high level. Inputs to the LPI slave are synchronised to this clock using the user-instantiated synchronisers. |
| reset_n | Input | Active low reset. Asserted asynchronously, deasserts synchronously to clk. Driven from the external top level reset input for the component. |

Application Signals

| Signal | | Description |
|---|---|---|
| wake_up | Input | Activity indication from application requiring clock or power to be restored or maintained. May be tied low if the component is only woken up by the controller removing the request on qreq_sync_n. |
| lp_request | Output | Synchronised version of qreq_sync_n. Indicates to the application that a request for a low power state has been received. This is only used in the application if actions need to be performed before accepting a low power request. |
| dev_active | Input | Activity indication from application to drive decision to accept or deny quiescence. This goes into the state machine but may come from the same source as wake_up and is driven from synchronous logic in the application. May be tied low if a request is never denied. This must always indicate the activity state of the component so that the decision to accept or deny a low power request can be made autonomously by the LPI slave without waiting for the application. |
| lp_done | Input | In response to lp_request, indicates that any work that needs to be done before entering a quiescent state has been completed. Uses a 4-phase handshake with lp_request. May be tied to lp_request if it is guaranteed in a particular instance that a request can be accepted immediately. |
| dev_run | Output | Status output indicating that the application should be able to operate normally. |
| cg_en | Output | Clock gate enable. Used as gating signal to local architectural clock gate (outside the LPI slave module).<br>0: Clock is gated off<br>1: Clock is enabled<br>Note that this is for synchronous clock gating only, i.e. gating the same clock as used by the LPI slave state machine. The clock is enabled for LPI slave operation. |
| ext_wake | Output | This is implemented using the XOR gate 360. Signal to initiate wake up of external hardware during transitions on the Low Power Interface. Asserts when qreq_n (unsynchronised) is asserted and qaccept_n is deasserted and when qreq_n is deasserted and q_accept_n is asserted.<br>The most common use of this is for waking up a clock so that power LPI transactions can be processed. |

The wake_up input is used to drive the qactive output via a combinatorial path. This is a feed-through to qactive and is only included to provide a clean interface to the application.

The dev_active input is used in the state machine to drive the decision to accept or deny a request for quiescence. In many applications this can also come from the same source as wake_up, but by separating the two signals the user has the option of using an incoming asynchronous event, which could be from another clock domain, to request the clock (via qactive), whilst making the accept/deny decision based on local synchronous signals. It is then possible to use synchronous logic from the application to drive the decision of accept/deny to a quiescence request.

Figure 4:
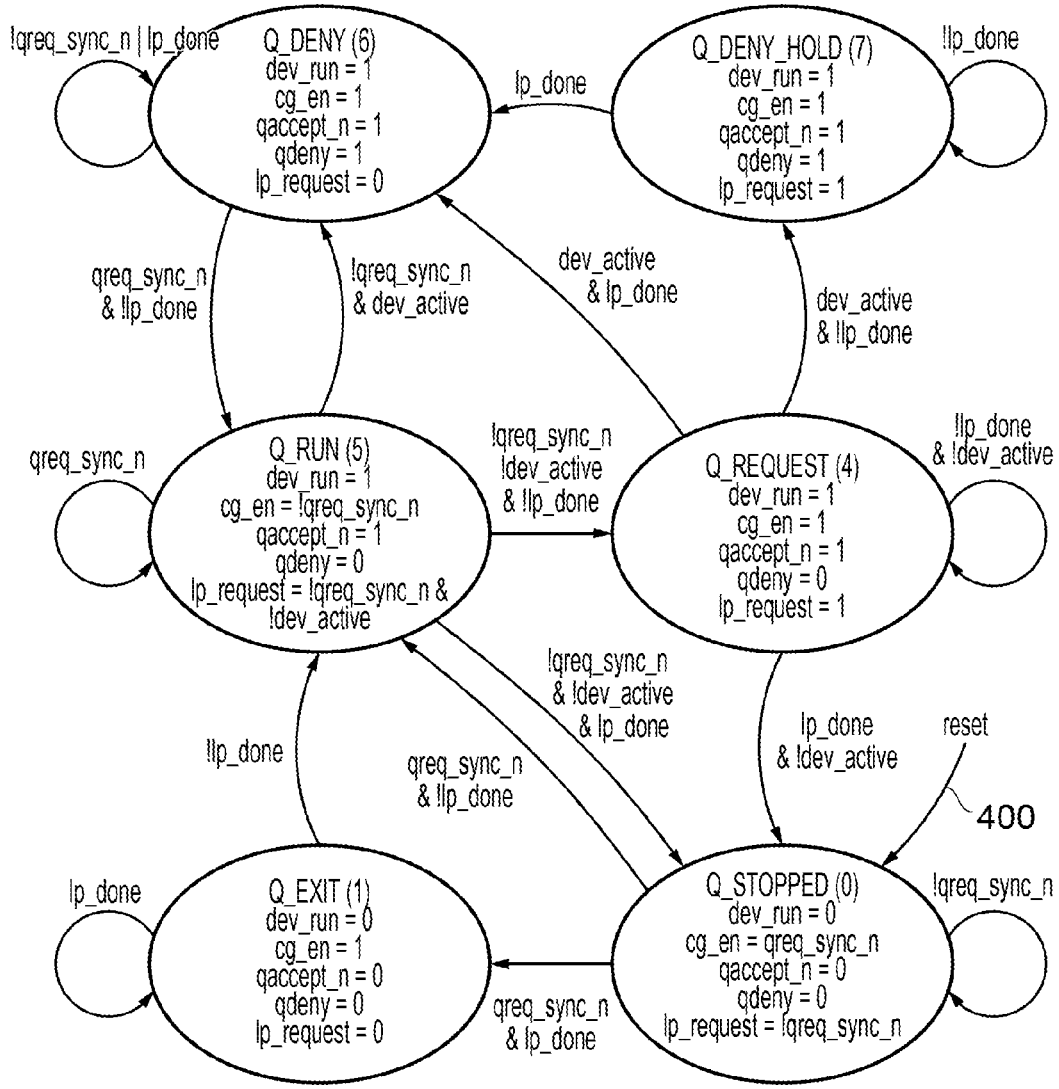
FIG. 4 is a schematic state diagram for an LPI slave device.

FIG. 4 is a schematic state diagram representing (in more detail and shown in FIG. 3) the operation of the state machine 330.

By way of context for the operation of the state machine 330, the Q-Channel LPI is used to implement a power control interface to manage high level clock gating and simple power on/off switching. The LPI is used to manage the internal state of a component prior to stopping a clock externally or removing power to the component. In some cases, a component may have more than one LPI, where separate LP's are used for clock or power control. A single LPI may not be used for both clock and power control. In examples, up to three LP's may be present on a component, to deal with the existence of two clocks and one power control interface.

The general principles of clock gating are that a component can have its clock gated off at a high level in the clock tree if there are identifiable periods when it has no work to perform. Gating the clock high in the tree allows power to be saved in the component and also in the clock tree itself, after the clock gate.

As discussed above, the Q-Channel LPI provides the following basic controls:
1) An input to request the component enters a low power state
2) Outputs to respond to low power requests
   a) Acceptance of request
   b) Denial of request
3) An output to request a clock is provided if the component has work to do The LPI therefore gives the component the ability to do the following:
1) Perform housekeeping tasks before entering a low power state
2) Go into a low power state if there is no work to do or if there is work to do that takes a deterministic and relatively short time
3) Deny a request for entry to a low power state if the component is busy or has work to do that could be of indeterminate length
4) Determine when it has exited a low power state so that it can perform housekeeping or re-initialisation tasks
5) Use external signal inputs to request a clock if there is work to do If a request is made to put a component into a low power state, it is not mandatory for the clock or power controller to actually complete the process by removing the power or gating the clock. The component being controlled must always behave correctly irrespective of whether the power or clock are actually removed. In the case of power removal, it is mandatory to provide an external reset to the component to put it into a known state following power up. If the controller did not actually remove power though, the reset is not mandated. Following the reset, any other housekeeping is the responsibility of the component.

Aspects of the state machine operation will now be discussed with reference to FIG. 4.

Reset and Transition to Q_RUN

Following a reset 400, the state machine is in the Q_STOPPED state in which the controlled device is in a quiescent state. In most cases the qreq_sync_n input will be high (inactive) so the next transition will be to the Q_EXIT state and then to the Q_RUN state when lp_done is low, either directly or via Q_EXIT, if lp_done is high until the component is initialised. In other words, lp_request is asserted; if lp_done is immediately signalled as an acknowledgement then the state moves directly to the Q_RUN state in which the controlled device is in a non-quiescent state and is operational. If however there is a delay in signalling lp_done (for example because of housekeeping or other delay at the controlled device) then the state machine first enters Q_EXIT until lp_done is asserted, at which point it moves to Q_RUN.

If the clock or power controller requests quiescence immediately from the start (for example, from reset), then the LPI slave will transition out of Q_STOPPED only when the request for quiescence is removed (qreq_sync_n high).

In the Q_EXIT state the lp_request output is deasserted. This can be used in the application to initiate any tasks that need to be done when exiting from quiescence. If those tasks take more than one cycle of clk then the lp_done signal is held high until the tasks are done. The signal may be used as a trigger to some other controller or state machine that handles the external work. If no specific work needs to be done following exit from Q_STOPPED then (as mentioned above) the lp_done output can be tied to lp_request to complete the 4-phase handshake on those signals.

When in Q_STOPPED the dev_run output is deasserted. This can be used as a qualifying signal to any mission-mode logic in the application that needs to know that normal operation is ongoing.

Exit from Q_RUN State

When qreq_sync_n is asserted (low) to request the controlled device to move to a quiescent mode, the LPI slave needs to decide if the quiescence request is to be accepted or denied. The dev_active input is used to make this decision. Note that in the state diagram, the qreq_sync_n signal is the output from a synchroniser and not the asynchronous input signal. The design assumes that the information needed to deny a request is available all the time but if the decision is taken to accept a request then some work may need to be done before signalling acceptance to the controller. The exit conditions from Q_RUN therefore form a three-way branch:

To Q_DENY (asserting the deny signal and denying the request for quiescent operation) if dev_active is asserted, meaning that there is ongoing activity and the component cannot enter a quiescent state.

To Q_STOPPED if dev_active is not asserted and lp_done is tied to lp_request, meaning that there is no ongoing activity and no required work to do and the component can enter a quiescent state immediately.

To Q_REQUEST if dev_active is not asserted but the component has work to do before going to a quiescent state (indicated by a delay in lp_done being signalled).

The dev_active input is driven by synchronous logic in the application as it is used in the state machine.

The wake_up input is driven combinatorially if there are events that need to wake up the component when the clock is stopped.

Quiescence Accept

If a request is accepted, the application may still have work to do before signalling the acceptance to the controller. To cater for this, the Q_REQUEST state is entered. A transition is made to Q_STOPPED only once the lp_done input is asserted. If the application never needs additional time to do anything then the lp_done input can be tied to lp_request.

Normal Denial

If dev_active is asserted when qreq_sync_n asserts then the component is busy and denies the request. Q_DENY is entered immediately in this case and returns to QRUN when qreq_sync_n goes high. Note that lp_done must be low to return but if the entry to Q_DENY was from Q_RUN then lp_request will not have asserted so lp_done should also not assert.

Late Denial

In some situations, when in the Q_REQUEST state, dev_active may assert due to new activity in the component, just while the clock controller is trying to put the component into a low power state. In this case it is beneficial to deny the request to avoid having to wait for the clock to be gated off and then reinstated by the clock controller. In this case a transition is made to Q_DENY and the quiescence request is denied. If the component was still processing housekeeping functions when dev_active asserted then it is possible that lp_done won't have asserted yet in response to lp_request. In this case the state machine first moves to Q_DENY_HOLD in order to wait for lp_done to assert before moving to Q_DENY. This ensures that the lp_request/lp_done signals follow a 4-phase handshake before returning to Q_RUN. In the application, since lp_request always asserts in Q_REQUEST, lp_done is always asserted following lp_request, even if dev_active subsequently asserts.

Local Clock Gating

In addition to asserting dev_run, cg_en is asserted, which can be used as a local clock gate enable, if an architectural clock gate is included within the application. This may be beneficial if the high level clock source is shared with other components that may deny the quiescence request when this component accepts it. Locally gating the clock will reduce power in this component even if the entire clock tree branch can't be gated. Separating the clock gate enable from the dev_run signal allows it to be uniquely identified as a clock gate control in the implementation flow for timing closure.

The logic for cg_en means that it asserts when the LPI slave needs to do something. It allows for the clock to be gated off when in Q_STOPPED and qreq_sync_n is asserted and also in Q_RUN when qreq_sync_n is deasserted. In all other states cg_en is asserted to ensure the clock is present.

If the clock gate is also used to gate the clock to other logic outside of the LPI slave, then a gating signal must be generated to indicate when the clock is required. This should then be ORed with cg_en to present the combined clock gate enable to the clock gate cell.

Figure 5:
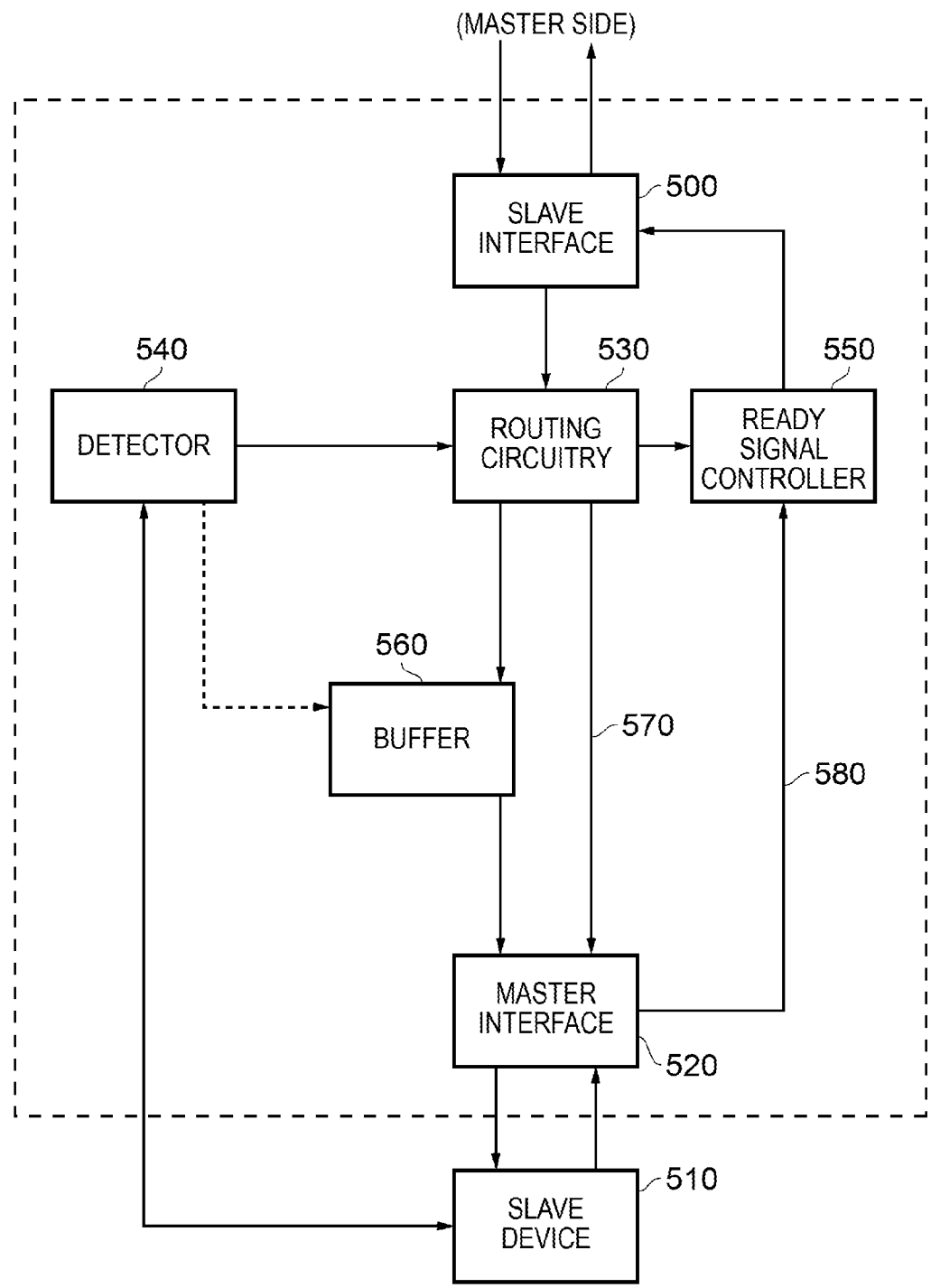
FIG. 5 is a schematic diagram of an interface.

FIG. 5 is a schematic diagram of an interface forming part of the functionality of the ACG discussed above. The way in which this functionality relates to that of the LPI slave device will be explained below.

Communications with master side devices are provided by a slave interface 500 and communications with slave side devices such as a device 510 are provided by a master interface 520. Not all of the signals passing through these interfaces are shown in FIG. 5 for clarity of this schematic explanation. Routing circuitry 530 and a detector 540 are provided to cope with the situation in which a first transaction is received from a master via the slave interface 500 but the recipient device is currently in a quiescent mode.

To handle this eventuality, the detector 540 is arranged to detect a first transaction when the slave device 510 is quiescent. In response to that detection the detector 540 initiates a waking up process to bring the slave device 510 back into a normal operational mode from the quiescent mode. The detector 540 also indicates to routing circuitry 530 and to a ready signal controller 550 to operate as follows. The routing circuitry 530 routes the incoming data item to a buffer, latch or other storage 560 in which it is held until the slave device 510 is ready to receive that data item. The ready signal controller sets the HREADY signal provided back to the master device via the slave interface 500 to low, indicating that the master device should wait before sending the next data item.

In this way, it appears to the master device that its first transaction and the first data item have been accepted and that the master device is simply waiting for the slave device to be ready to receive the next data item. In fact, the first transaction has been accepted only by the ACG and is held in the buffer 560 while the slave device is brought back from a quiescent to a non-quiescent state. The HREADY signal is provided by the ready signal controller 550 rather than the slave device 510 in the first instance. However, this arrangement does provide compliance with the requirement in the AHB specification that the first transaction is accepted.

As mentioned above, the detector 540 initiates a transition of the slave device 510 from a quiescent to a non-quiescent mode. When the slave device is operational again, the stored data item is released from the buffer 560 to be passed via the master interface 520 to the slave device 510. The routing circuitry 530 is controlled by the detector to route further incoming data items via a direct data path 570 which does not impose a delay of one clock cycle or more. The ready signal controller 550 changes its mode of operation to forward a ready signal 580 received from the slave device 510 rather than asserting its own version of the HREADY signal.

It will be appreciated that if a first data transaction is received when the slave device 510 is already in a non-quiescent state, then it would simply be routed by the routing circuitry 530 along the second data path 570 to the slave device 510 and the ready signal controller 550 would simply forward the HREADY signal provided by the slave device 510. Therefore, in this scenario, no delay is applied to the passing of the data item to the slave device 510 and the arrangement is invisible to the master and slave devices.

The data path 570 (and the equivalent 760 in FIG. 76 to be discussed below) provide an example of the data items being received by the interface according to a data item clock; and an arrangement in which a given data item routed by the second data path (570, 760) is provided at an output of the second data path during the same clock cycle in which that given data item was routed to the second data path.

Overall, FIG. 5 provides an example of an interface comprising:

routing circuitry configured to receive data items from a data source device and to route the received data items to a data sink device by either a first data path including a data buffer or a second data path, in response to an indication of a current state of a data sink device;

the routing circuitry being configured to route the received data item by the first data path and to initiate a transition of the data sink device to a ready state in response to an indication that the data sink device is in a quiescent mode and currently not ready to receive the data item, the routing circuitry being configured to hold the data item at the buffer and to inhibit the data source device from sending further data items until the routing circuitry receives a subsequent indication that the data sink device is ready to receive the data item; and the routing circuitry being configured to route the received data item by the second data path in response to an indication that the data sink device is currently ready to receive the data item.

When a data item for the sink device has been held at the data buffer, the routing circuitry is configured to pass the data item held by the data buffer to the slave device in response to the slave device becoming ready to receive the data item, before the routing circuitry routes any data items to that slave device by the second data path.

Figure 6:
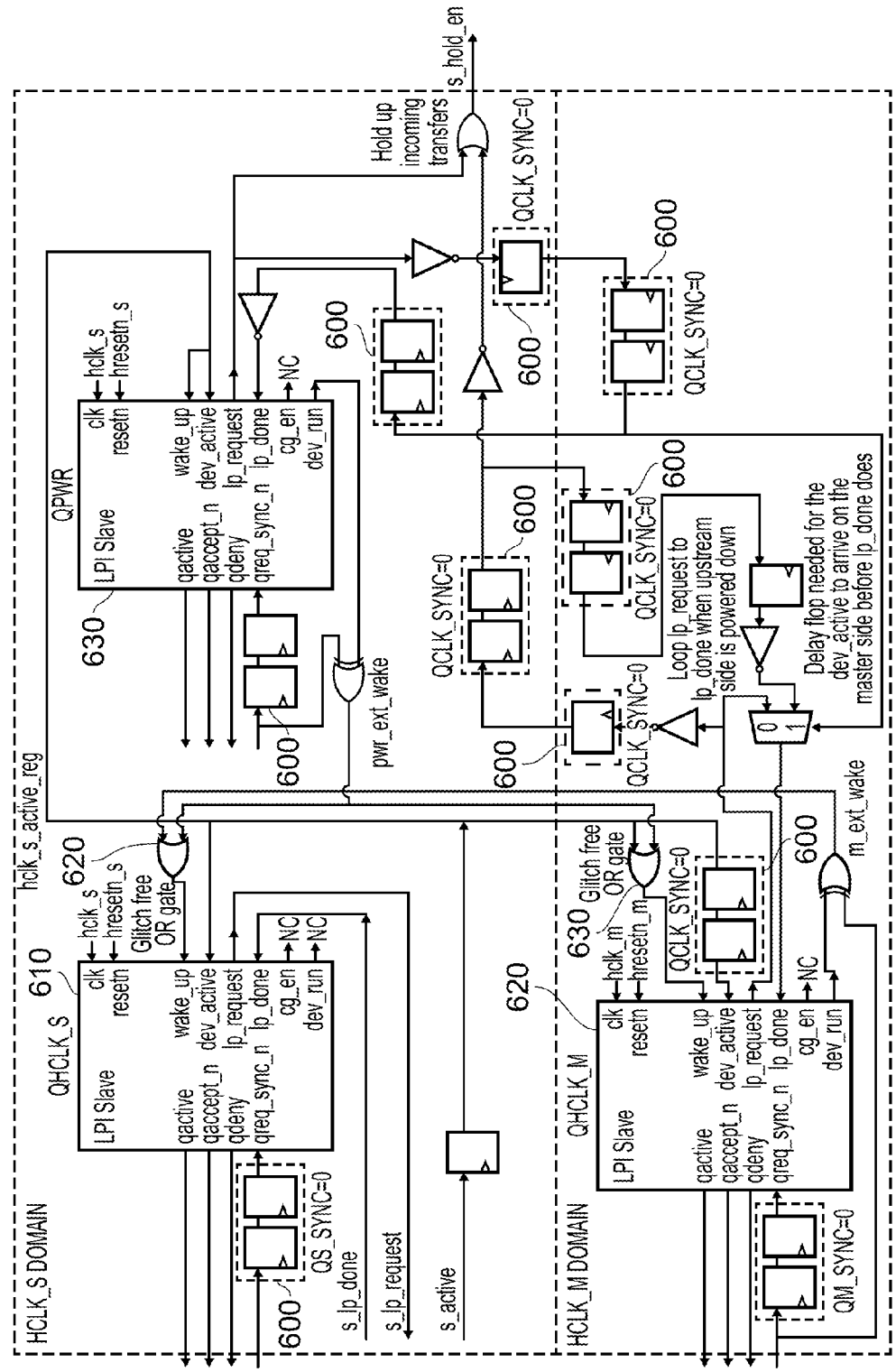
FIG. 6 schematically illustrates a part of an access control gate.

FIG. 6 schematically illustrates a part of an ACG providing at least some of the functionality discussed above.

Three LPI slave devices 610, 620, 630 (of the type discussed above) are connected in order to provide core logic for the ACG when handling three different Q-Channel interfaces. The upstream (master side, drawn in the upper part of FIG. 6) and downstream (slave side, drawn in the lower part of FIG. 6) clock domains have their own Q-Channels (handled by the LPI slave devices 610, 620 respectively) and there is a third Q-Channel (handled by the LPI slave device 630) for the combined power domain.

Additionally the Q-Channel handling logic deals with the generation of a hold enable signal for blocking transfers on the datapath based on the clock or power Q-Channel or external gate requests.

This core logic can be reused in the ACG itself and even in the other bridge components where Q-Channel interface handling or external gating is required. It can be configured to be synchronous or asynchronous regarding the upstream and downstream clock domains via a parameter QCLK_SYNC. When QCLK_SYNC=1 it means that the two sides of the ACG are synchronous and synchronizers 600 in FIG. 6 are not present.

Significant input and output signals in FIG. 6 not already described are as follows:

| Signal Name | | Description |
| --- | --- | --- |
| s_hold_en | Output | Hold enable signal to indicate that the ACG cannot let transfers through due to either the clock or the power domain is down or an external gating request is accepted. |
| s_active | Input | Upstream side activity indication from application to drive decision to accept or deny quiescence. This signal is combinatorically generated from the incoming transfer. Combinatorial input is registered internally to generate the QACTIVE signals. When the ACG is configured to respond with error while the hold_en is active, then the s_active shall be set low to enable the ACG to go to quiescent state. |
| pend_trans | Input | Upstream side indication that there is an already accepted pending transfer ongoing. This needs to be active for the second and remaining cycles of a burst, an already ongoing locked sequence or for a waited transfer. This signal shall be low for incoming new NSEQ requests which are not part of previous transfers. This signal is used to block incoming external gating requests and makes sure hold_en is not active during a pending transfer. This signal is not generated from the hold_en signal as that would result in a combinatorial loop. It (or a signal derived from it) can be used to inhibit a slave device entering the quiescent mode while a data transfer transaction relating to a data item associated |

-continued

| Signal Name | Description |
| --- | --- |
| | with that data sink device is being routed by the interface. |

The operation of each individual LPI slave device (shown in FIG. 6 as devices 610, 620, 630) has been discussed above. The expression "NC" indicates "not connected".

The signal s_hold_en is generated as an OR combination of the lp_request signal issued by the power domain LPI slave 630 and the lp_request signal issued by the slave side clock domain LPI slave 620. This means that the s_hold_en signal is asserted if either the power domain or the slave side clock domain is controlled to enter the quiescent state. Note that the signal lp_request indicates a request to the controlled device to enter that state, rather than necessarily indicating the actual state attained by the controlled device (for example, there can be a delay between asserting lp_request and the device entering the quiescent state). This dependency of s_hold_en (and, in FIG. 7 discussed below, of hold_en) on the lp_request signals represents an example of the interface detecting the quiescent state and buffering an incoming first transaction in response to that detection.

In the arrangement of FIG. 6, the lp_request signals are looped back to form lp_done signals for the LPI slaves 620, 630, for the reasons set out above.

The ext_wake signals generated by the power domain LPI slave device 630 and the slave side LPI slave device are combined by an OR gate 620 to form a wake_up signal for the master side clock domain LPI slave device 610. The active indication s_active (received from the circuitry of FIG. 7—see below) forms a wake-up signal for the power domain LPI slave device 630 and the downstream side (slave side) clock domain LPI slave device 620. The wake_up signal for the slave side clock domain LPI slave device is in fact formed by an OR combination of this signal (by an OR gate 630) with the ext_wake signal from the power domain LPI slave device 630. The use of s_active in this way provides an example of routing circuitry of the interface initiating a transition of the data sink device (a slave device in this example) to a ready (non-quiescent) state.

Figure 7:
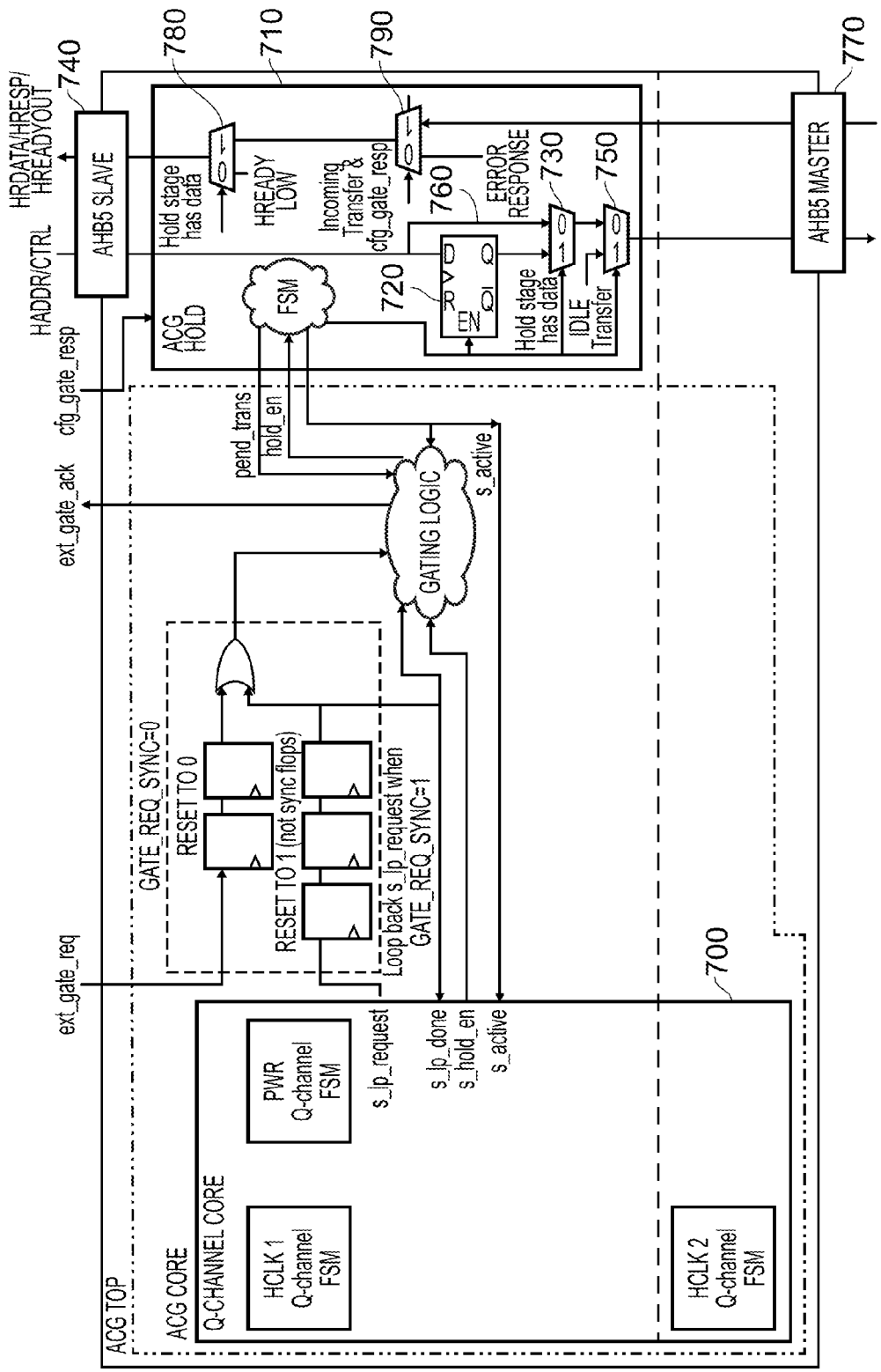
FIG. 7 schematically illustrates an access control gate.

FIG. 7 schematically illustrates an access control gate including (as a schematic box 700) the circuitry of FIG. 6. That box provides the outputs s_lp_request and s_hold_en and receives the inputs s_active and s_lp_done.

A schematic box 710 indicates hold circuitry which provides part of the function of the arrangement of FIG. 5.

A latch 720 provides the functionality of the buffer 560 in FIG. 5. The latch forms part of one data path between a slave (master side) interface 740 and a multiplexer 730 and a multiplexer 750. The other data path is provided by a schematic direct connection 760.

The hold enable signal hold_en is derived at least in part from the s_hold_en signal discussed above, so that hold_en is asserted at least when s_hold_en is asserted. When a hold function is enabled, the latch 720 is enabled and the multiplexer 730 is set so as to pass the output of the latch 720 rather than the data carried by the direct connection 760. The multiplexer 750 is controlled to indicate (to the master (slave side) interface 770) an idle state (providing an example of the routing circuitry being configured to provide a signal to the data sink device indicating an idle state of the data source device when a data item is held by the buffer and the sink device is in the quiescent mode.)

So, when hold_en is active, indicating that the data should not be passed but instead should be held, the incoming data item is held by the latch 720. The multiplexers 730, 750 provide the functionality of the routing circuitry 530 of FIG. 5.

When hold_en is deactivated after having been active, the value held by the latch is passed to the interface 770 by the multiplexers 730, 750.

When hold_en is inactive, the route from the interface 740 to the interface 770 is directly via the direct connection 760 and the two multiplexers 730, 750.

Turning now to the handling of the HREADY signal, when the hold_en signal is asserted, a multiplexer 780 passes an HREADY=LOW signal to the interface 740 and from there to the master device, causing the master device to wait and not to send the next data item (until the HREADY=LOW signal has been cleared and HREADY is set to HIGH). When hold_en is not set, HREADY signals from the slave device (via the interface 770) are passed to the master device via the multiplexers 790, 780. This provides an example in which a data item is sent by a data source device in response to a ready indication from a data sink device; in which the routing circuitry is configured, for a data sink device currently in the quiescent mode, to provide a ready indication to the data source device, to receive and hold a first data item from the data source device, and to inhibit the data source device from sending further data items by providing a not ready indication to the data source device.

If there is an incoming transfer detected and cfg_gate_resp is asserted (cfg_gate_resp being an indicator to determine whether a transaction should be waited (deferred) or an error response given), then the multiplexer 790 passes an error response rather than the response received from the interface 770.

The arrangement of FIG. 7 also allows for external gate requests (ext_gate_req) to cause the latching operation described above to be performed. An ext_gate_req signal is synchronised and combined with s_lp_request and allows data transactions to be inhibited under the control of an external signal, for example for certain master devices (for example during a security update procedure). An acknowledgement signal ext_gate_ack is used as a handshake to confirm receipt of the ext_gate_req signal and that transactions are now being prevented. When ext_gate_ack is deasserted, this indicates that transactions are allowed to proceed.

Therefore, comparing FIG. 5 and FIG. 7, the multiplexer 780 provides the functionality of the ready signal controller 550. the block 700 provides the functionality of the detector 540.

Figure 8:
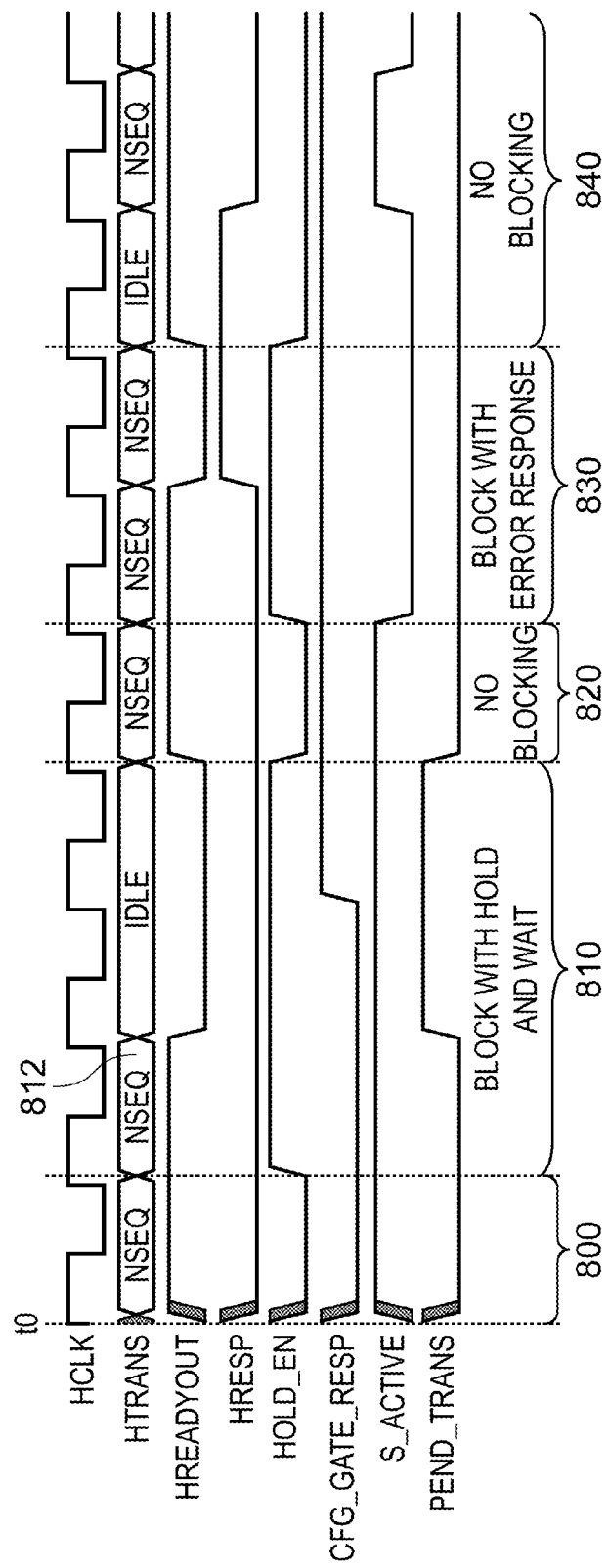
FIG. 8 is a schematic timing diagram.

FIG. 8 is a schematic timing diagram illustrating some of the operations described above. Time progresses from left to right along a horizontal axis. HCLK is a clock signal by which transactions are carried out.

Various situations are represented in FIG. 8.

A first example transaction in a period 800 is allowed to pass.

In a period 810, blocking with hold (by the latch 720) is enabled. A first transaction 812 is accepted by the ACG and held (noting the rise in hold_en at the start of the period 810). Subsequent cycles in the period 810 are IDLE. The signal HREADY is set to LOW after the first data item in this period has been accepted. The PEND_TRANS flag is set to high once the data item corresponding to the transaction 812 has been held.

In a next period 820, blocking is not applied.

In a next period 830, blocking is applied but with an error response rather than with the data being held. Both hold_en and cfg_gate_resp are high and s_active is low. The last NSEQ cycle in the period 830 may in fact be extended as a result (to more than one NSEQ period).

In a next period 840, blocking is not applied.

Figure 9:
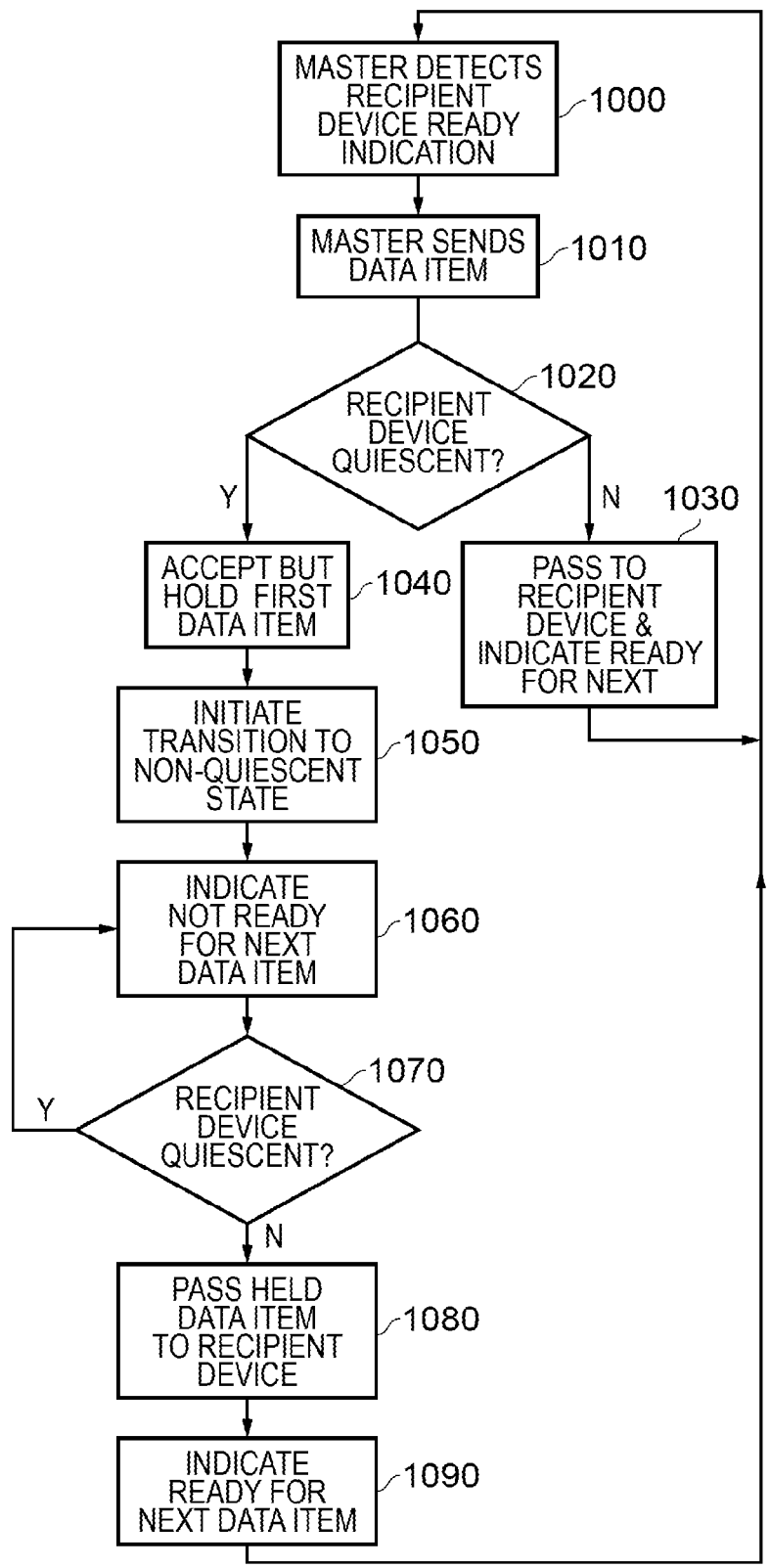
FIG. 9 is a schematic flow chart illustrating an interface method.

FIG. 9 is a schematic flowchart illustrating an interface method.

At a step 1000, a master device detects a ready indication from a recipient slave device and, at a first instance of a step 1010, the master device sends a first data item to the slave device.

At a step 1020, the ACG discussed above detects whether the recipient device is quiescent. If the answer is no then control passes to a step 1030 at which the incoming data item is passed directly to the recipient device and the recipient device controls the indication of when it is ready for a next data item. Control returns to the step 1000.

If, at the step 1020, the recipient device was quiescent, then at a step 1040 the buffer of the ACG accepts and holds the first data item. The ACG initiates a transition by the recipient device to a non-quiescent state at a step 1050, and at a step 1060 the ACG indicates to the master device that it is not ready for the next data item to be sent.

A further detection is made at a step 1070 as to whether the recipient device is quiescent. If the answer is yes then control returns to the step 1060 and the ACG continues to indicate a state of not being ready for the next data item. If, however, the answer is no then at a step 1080 the buffered or held data item is passed to the recipient device and, at a step 1090, the recipient device is allowed to indicate that it is ready for the next data item. Control returns to the step 1000.

FIG. 9 therefore provides an example of an interface method comprising:

receiving data items from a data source device;

routing the received data items to a data sink device by either a first data path including a data buffer or a second data path, in response to an indication of a current state of a data sink device;

the routing step comprising:

routing the received data item by the first data path and to initiate a transition of the data sink device to a ready state in response to an indication that the data sink device is in a quiescent mode and currently not ready to receive the data item, holding the data item at the buffer and inhibiting the data source device from sending further data items until a subsequent indication that the data sink device is ready to receive the data item is received; and routing the received data item by the second data path in response to an indication that the data sink device is currently ready to receive the data item.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interface comprising:
routing circuitry configured to receive data items from a data source device and to route the received data items to a data sink device by either a first data path including a data buffer or a second data path, in response to an indication of a current state of a data sink device;
the routing circuitry being configured to route the received data item by the first data path and to initiate a transition of the data sink device to a ready state in response to an indication that the data sink device is in a quiescent mode and currently not ready to receive the data item, the routing circuitry being configured to hold the data item at the buffer and to inhibit the data source device from sending further data items until the routing circuitry receives a subsequent indication that the data sink device is ready to receive the data item; and
the routing circuitry being configured to route the received data item by the second data path in response to an indication that the data sink device is currently ready to receive the data item; and
circuitry to inhibit a data sink device entering the quiescent mode while a data transfer transaction relating to a data item associated with that data sink device is being routed by the interface.

2. An interface according to claim 1, in which:
the data items are received by the interface according to a data item clock; and
a given data item routed by the second data path is provided at an output of the second data path during the same clock cycle in which that given data item was routed to the second data path.

3. An interface according to claim 1, in which:
the data sink device is configured to operate in a lower power consumption mode in which the data sink device is not ready to receive a data item, and a higher power consumption mode in which the data sink device is ready to receive a data item.

4. An interface according to claim 3, comprising a power controller to control a power consumption of the data sink device.

5. An interface according to claim 1, in which:
the data sink device is configured to operate in a lower speed or clock running mode in which the data sink device is not ready to receive a data item and a higher speed or clock running mode in which the data sink device is ready to receive a data item.

6. An interface according to claim 5, comprising a clock controller to control the clock speed of the data source device.

7. An interface according to claim 1, in which a data item is sent by a data source device in response to a ready indication from a data sink device;
in which the routing circuitry is configured, for a data sink device currently in the quiescent mode, to provide a ready indication to the data source device, to receive and hold a first data item from the data source device, and to inhibit the data source device from sending further data items by providing a not ready indication to the data source device.

8. An interface according to claim 1, in which the routing circuitry is configured to provide a signal to the data sink device indicating an idle state of the data source device when a data item is held by the buffer and the sink device is in the quiescent mode.

9. An interface according to claim 1, in which, when a data item for the sink device has been held at the data buffer, the routing circuitry is configured to pass the data item held by the data buffer to the sink device in response to the sink device becoming ready to receive the data item, before the routing circuitry routes any data items to that sink device by the second data path.

10. An interface according to claim 1, in which data transfer transactions between the data source device and the data sink device are handled by a protocol which requires a first data transfer from a data source device to be accepted.

11. A data processing system comprising:
one or more data source devices;
one or more data sink devices; and
an interface according to claim 1, disposed in a data path between the data source and data sink devices.

12. A system according to claim 11, in which:
the one or more data source devices are master devices;
the one or more data sink devices are slave devices; and
each master device is configured to control data transfer transactions between that master device and one or more of the data sink devices.

13. A system according to claim 11, the system being implemented by a single integrated circuit.

14. An interface comprising:
routing means for receiving data items from a data source device and for routing the received data items to a data sink device by either a first data path including a data buffer or a second data path, in response to an indication of a current state of a data sink device;
the routing means being operable to route the received data item by the first data path and to initiate a transition of the data sink device to a ready state in response to an indication that the data sink device is in a quiescent mode and currently not ready to receive the data item, the routing means being operable to hold the data item at the buffer and to inhibit the data source device from sending further data items until the routing means receives a subsequent indication that the data sink device is ready to receive the data item; and
the routing means being configured to route the received data item by the second data path in response to an indication that the data sink device is currently ready to receive the data item; and
means for inhibiting a data sink device entering the quiescent mode while a data transfer transaction relating to a data item associated with that data sink device is being routed by the interface.

15. An method performed in an interface comprising:
receiving data items from a data source device;
routing the received data items to a data sink device by either a first data path including a data buffer or a second data path, in response to an indication of a current state of a data sink device;
the routing step comprising:
routing the received data item by the first data path and to initiate a transition of the data sink device to a ready state in response to an indication that the data sink device is in a quiescent mode and currently not ready to receive the data item, holding the data item at the buffer and inhibiting the data source device from sending further data items until a subsequent indication that the data sink device is ready to receive the data item is received; and routing the received data item by the second data path in response to an indication that the data sink device is currently ready to receive the data item; and inhibiting a data sink device entering the quiescent mode while a data transfer transaction relating to a data item associated with that data sink device is being routed by the interface.

* * * * *